United States Patent [19]

Nycum

[11] 4,066,234
[45] Jan. 3, 1978

[54] UNIVERSAL SHOCK AND VIBRATION MOUNTS

[75] Inventor: James M. Nycum, Holland, Pa.

[73] Assignee: The United States of America as represented by the Secretary of the Navy, Washington, D.C.

[21] Appl. No.: 435,786

[22] Filed: Jan. 23, 1974

[51] Int. Cl.$^2$ .............................................. F16F 15/04
[52] U.S. Cl. ................................................ 248/358 R
[58] Field of Search ............... 248/20, 21, 350, 358 R, 248/399, 400; 267/35, 113

[56] References Cited

U.S. PATENT DOCUMENTS

| | | | |
|---|---|---|---|
| 647,873 | 4/1900 | Perry | 248/350 X |
| 1,166,811 | 1/1916 | Bowers | 267/113 X |
| 2,535,080 | 12/1950 | Lee | 248/358 R |
| 3,219,362 | 11/1965 | Epstein | 248/22 X |
| 3,251,076 | 5/1966 | Burke | 188/298 X |
| 3,658,314 | 4/1972 | Luzsicza | 267/35 X |

FOREIGN PATENT DOCUMENTS

| | | | |
|---|---|---|---|
| 960,580 | 6/1964 | United Kingdom | 248/22 |

*Primary Examiner*—William H. Schultz
*Attorney, Agent, or Firm*—R. S. Sciascia; Henry Hansen

[57] ABSTRACT

A universal mounting base for protecting fragile equipment against shock and vibration. A resilient plastic foam pad of rectangular outline is divided into quadrature air cavities and sandwiched between bottom and top plates. The top plate includes four matrices of holes, each matrix registering with a respective cavity, and being selectively blocked by cover pads interfaced between the top plate and the bottom of the equipment to be supported. Holes selected for blocking are empirically determined for a given weight and center of gravity of the equipment to achieve maximum dynamic stability and protection.

9 Claims, 2 Drawing Figures

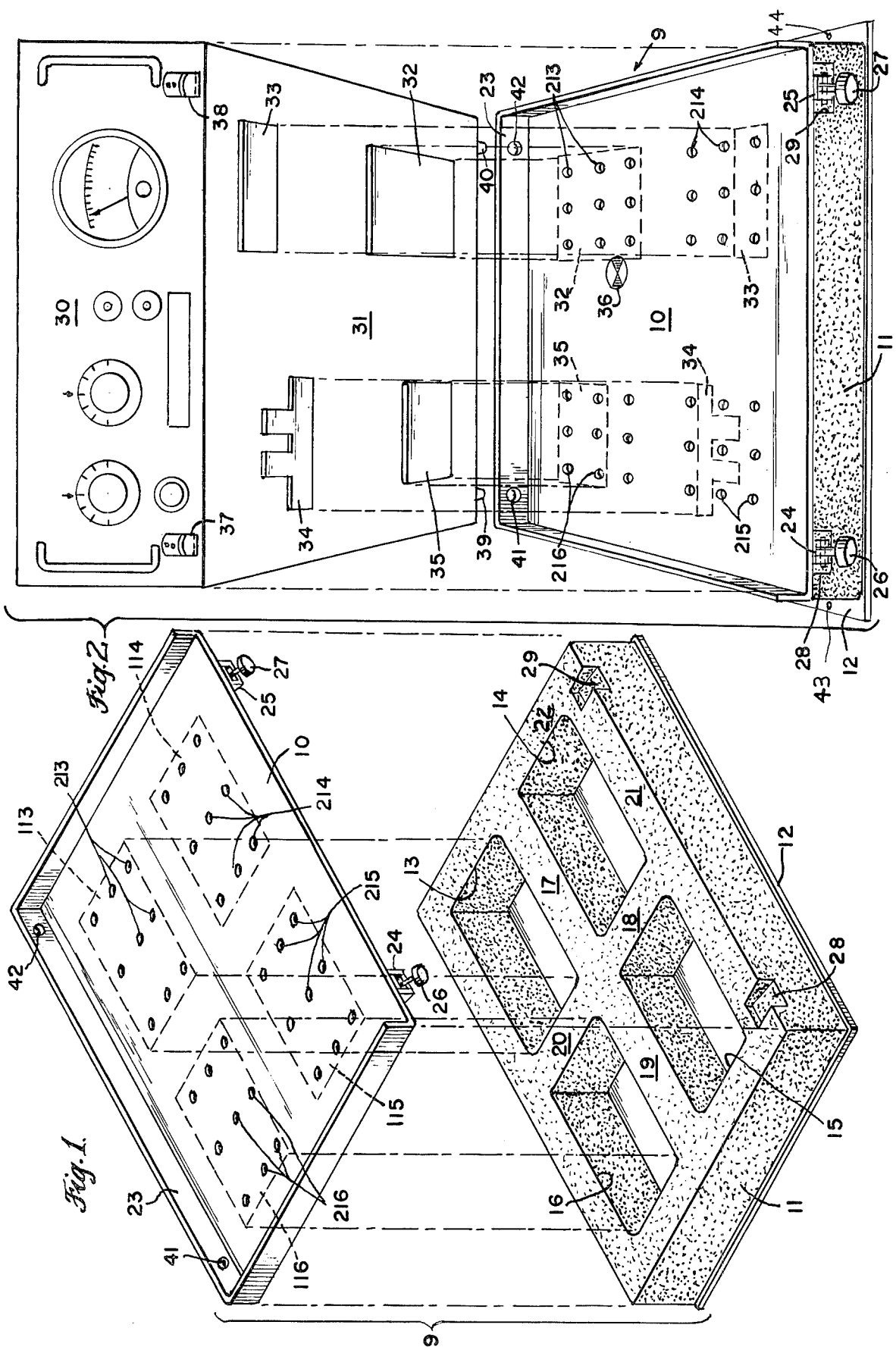

UNIVERSAL SHOCK AND VIBRATION MOUNTS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to the field of supports and more particularly to shock and vibration damping supports.

Present methods of protecting fragile electronic equipment against shock and vibration in aircraft, ships, and vehicles include varieties of "cup type" isolators and simple or plain resilient plastic foam mounts which may or may not be specifically designed for a particular equipment load and center of gravity. As many as 600 or more standard "cup type" mounting bases are presently in use depending on required dynamic performance, as well as dimensional and load ranges of the equipment being mounted. Inadvertent interchanging of mounting bases depending solely on size consideration is one of the major causes of equipment failure due to shock or vibration. These mounts must also be compatible with the protected equipment in dynamic response characteristics as well as size. The erroneous selection of a proper sized base without consideration of the correct dynamic characteristics renders the supported equipment vulnerable to various modes of dynamic failure. Due to logistics problems created by the large number of presently available "cup type" isolators and resilient mounts, hostile surroundings, or lack of proper knowledge and understanding of the parameters involved, many mounting base substitution errors are made. One method of eliminating such errors is by properly controlled interfacing between the protected equipment and the mounting base in order to regulate dynamic system response and eliminate may failures due to shock and vibration. By providing as few as ten standard sized mounting bases ranging in size from 5×8 inches to 16×15 inches to replace the present myriad of isolators and mounts, and controlling dynamic response by proper interface design, significant logistics reductions as well as greater compatibility and interchangeability of mounting bases can be achieved.

SUMMARY OF THE INVENTION

Accordingly, it is a general purpose and object of the present invention to provide a simple, inexpensive, reliable, interchangeable, universal shock and vibration mounting base. It is another object to provide an interchangeable universal shock and vibration mounting base for fragile electronic equipment in aircraft, ships and other vehicles to replace present "cup type" isolators and plain resilient plastic foam mounts.

These and other objects are accomplished according to the present invention by a universal shock and vibration mount comprising a lower plate, an upper plate having a plurality of holes therethrough, resilient means sandwiched between the upper and lower plates having a cavity therein communicating with the holes, and cover means secured to the object to be mounted at the interface with the upper plate for blocking selective ones of said holes.

BRIEF DESCRIPTION OF THE DRAWINGS

FIG. 1 is a perspective view of a preferred embodiment of the universal shock and vibration mount constructed according to the invention, showing an upper plate thereof in exploded relation; and FIG. 2 is a perspective view of the mount of FIG. 1 showing electronic equipment to be mounted in exploded relation.

DESCRIPTION OF THE PREFERRED EMBODIMENT

Referring to FIG. 1, a universal mount 9, representing a preferred embodiment, includes an upper plate 10 shown in exploded relation above a resilient member 11, constructed for example of a polyurethane foam, and a lower plate 12. Plates 10 and 12 which may be constructed of any non-porous material, such as sheet aluminum, are securely fastened to opposite sides of member 11 in some convenient manner such as with glue or other types of adhesives. Member 11 contains cavities 13, 14, 15 and 16 therethrough, each having an equal area. Although four cavities are shown in the present preferred embodiment, it is to be understood that any number of cavities could be used depending on the degree of balancing and tuning desired. The individual cavities balance unsymmetrical dynamic load and tune system resonant frequencies by effectively adding or subtracting air springs, thus changing the overall system spring constant. Cavities 13 and 14 are separated and isolated from each other by a member 17 comprising the resilient material of member 11; cavities 14 and 15 are similarly separated and isolated by a member 18; cavities 15 and 16 are similarly separated and isolated by a member 19; and cavities 16 and 13 are separated and isolated by a member 20. Members 17, 18, 19 and 20 essentially prevent the flow of air between adjoining cavities, and members such as 21 and 22 adjacent respective edges of member 11 similarly prevent the escape of air from the cavities out through the sides when plates 10 and 12 are attached thereto. Some small quantities of air, however, pass through the foam cells of member 11 due to the "breathing" effect which takes place when the foam is compressed. Plate 12 is solid, while plate 10 contains four hole matrices 113, 114, 115 and 116 registering respectively with cavities 13, 14, 15 and 16. Each matrix contains nine holes designated 213, 214, 215, and 216 respectively, within each corresponding matrix, and each group of holes registers with a respective cavity. The number of holes in each matrix can be varied to produce varying degrees of tuning and balancing desired. Plate 10 further includes a rim 23 around three sides thereof formed to accept electronic equipment 30 shown in FIG. 2, and a pair of structures 24 and 25 fixed to the underside thereof containing pivotable tie-down bolts 26 and 27 respectively, for holding equipment 30 securely in place. Member 11 contains cutouts 28 and 29 for accepting respective structures 24 and 25.

Referring now to FIG. 2, equipment 30 is shown directly above and tilted upward from mount 9 exposing an undersurface 31 containing pads 32, 33, 34 and 35 attached thereto in some convenient manner such as with epoxy or glue and specifically positioned thereon to respectively block selective ones of holes 213, 214, 215 and 216. The location of the pads can easily be determined by projecting holes matrices 113, 114, 115 and 116 onto surface 31 of equipment 30, and placing the respective pads in proper position for covering the desired ones of the holes in each matrix. Pads 32, 33, 34 and 35 are preferably made of neoprene, rubber or other gasket material capable of forming a seal around holes 213, 214, 215 and 216, and are typically about ⅛ inch thick. The shape of each pad is determined by empirically defining the particular ones of holes 213, 214, 215 and 216 to be blocked in order to balance or equalize unsymmetrical dynamic forces. A typical equipment center of gravity projection is depicted by 36. The unsymmetrical static load produced at projection 36 must also be taken into account when selecting hole to be blocked. Although theoretical calculations could be made to determine necessary spring and damping rates, such calculations are complex, and an empirical approach is deemed preferable. Spring stiffness and damping characteristics of each quandrant of mount 9 are determined by foam cell density and air passage length and area, such as determined, for example, by the length and width of members 17, 18, 21 and 22, surrounding cavity 14. Diameters of holes 213, 214, 215 and 216 are also determined empirically and depend primarily on the volume of cavities 13, 14, 15 and 16 and the weight and mass distribution of equipment 30. The holes are appropriately sized to provide a desired stiffness of member 11 by limiting the rate of escape of air from each of cavities 13, 14, 15 and 16. In the present preferred embodiment, hole diameters of approximately 0.005 to 0.020 inches are used. Pads 32, 33, 34 and 35, in addition to determining the number of respective holes 213, 214, 215 and 216 that are blocked due to their respective shapes, provide an additional spring stiffness by selectively blocking the flow of air out of the cavities, thus balancing and tuning dynamic forces and adjusting critical resonant frequencies and stability of the entire vibrating system. Increasing the number of holes 213, 214, 215 and 216 in plate 10, decreasing the diameter of each hole, and adjusting the shape of pads 32, 33, 34 and 35 to cover more holes allows more critical balancing and finer tuning of the system. Under certain load conditions, as in the present preferred embodiment, a pad such as 34 does not block any holes, but merely acts as a spacer to maintain equipment alignment on mount 9. Equipment 30 contains lugs 37 and 38 on the front panel thereof designed to mate with pivotable tie-down bolts 26 and 27, which are tightened to secure the front of equipment 30 from movement when placed upon mount 9. A pair of guides 39 and 40 similarly mate with holes 41 and 42 in rim 23 to secure the back of equipment 30 from lifting off of mount 9. It should be understood that any equivalent method of securing equipment 30 to mount 9 would be equally effective. Holes 43 and 44 in plate 12 are provided for securing mount 9 to the vehicle in which the equipment is being installed, such as by bolting.

Following is a description of a typical procedure for balancing and tuning the system. Equipment 30 is secured on mount 9, which is placed on a vibration table. Selected holes 213, 214, 215 and 216 in mount 9 are covered, such as with adhesive tape. The holes initially selected for covering depend on the location of the unsymmetrical equipment center of gravity, and represent a first calculated estimate. The amount and equipment, hereinafter referred to as the system, are vibrated at various frequencies between 10-50 Hz. If there is pure vertical translation of the system, the system is balanced, but if in addition to vertical translation, there is also present a rocking mode, additional adjustment of the number of holes being blocked is necessary. This is accomplished by selectively covering or uncovering holes depending on the location of the imbalance. The above process is repeated until the system is dynamically balanced. System resonant frequency is then ascertained by measurement, such as with conventional vibration pickups and oscillographic equipment. It has been determined that fixed and rotary wing aircraft, ships and other vehicles in which the system will be installed have primary forcing frequencies varying up to 75 Hz. It is therefore an objective to design the mount to achieve a system resonant frequency which is not in conflict with the forcing frequency of the particular vehicle in which the equipment is to be installed. A frequently used range for avionics equipment on aircraft is 27-32 Hz. Tuning to a desired system resonant frequency is accomplished by covering additional holes in mount 9 to raise system frequency, or uncovering holes to lower system frequency. This procedure must be conducted in a symmetrical fashion in order to maintain dynamic system balance. When the desired system resonant frequency is achieved, pads 32, 33, 34 and 35 are properly shaped to cover the desired holes and are affixed to the bottom of equipment 30 in the proper locations.

Some of the many advantages of the novel universal mount hereindescribed should now be readily apparent. By providing a small number of mounting bases ranging from 5×8 inches to 16×15 inches in size for all standard electronic equipment, logistical support presently necessary to maintain the large number of different types of shock and vibration isolators is greatly reduced. The concept of attaching various shaped interface pads to the equipment being mounted increases reliability dramatically and practically eliminates maintenance or replacement of shock and vibration mounts. The universal mounts described herein are relatively easy to manufacture and inexpensive, reducing costs over presently used isolators by approximately 20 to 30 percent. Empirical determination of hole sizes and pad shapes for the limited number of different sized mounts and equipment are readily obtained by using available shock and vibration test equipment. These parameters could also be obtained with proper computer programs using well known digital computer techniques. These and other advantages should now be readily apparent from the foregoing description.

Obviously, many modifications and variations of the present invention are possible in light of the above teachings. It is therefore to be understood that within the scope of the appended claims, the invention may be practiced otherwise than as specifically described.

What is claimed is:

1. A universal shock and vibration mount comprising:
   a lower plate;
   an upper plate having a plurality of openings therethrough;
   a resilient member disposed between the upper plate and the lower plate and having a cavity therein communicating with said plurality of openings; and
   cover means superimposed upon a predetermined number of said plurality of openings for occluding the predetermined number of openings.

2. A universal shock and vibration mount comprising:
   a lower plate;
   an upper plate having a plurality of holes therethrough, wherein said holes are arranged in a plurality of distinct hole groups;

a resilient member disposed between the upper plate and the lower plate and having a plurality of cavities therein, wherein each cavity communicates with a respective one of said hole groups; and a plurality of cover means wherein each said cover means is superimposed upon a respective one of said hole groups for occluding a predetermined number of holes within a respective hole group.

3. A universal shock and vibration mount according to claim 2 wherein said cavities have substantially equal volumes.

4. A universal shock and vibration mount according to claim 3 wherein the holes within a hole group are arranged in a first predetermined geometric pattern and the hole groups are arranged in a second predetermined geometric pattern over the surface area of the upper plate.

5. A universal shock and vibration mount according to claim 4 wherein said resilient member comprises an open cell foam material.

6. A universal shock and vibration mount for an object having at least one surface comprising:
a lower plate;
an upper plate formed to receive said surface and having a plurality of holes therethrough wherein said holes are arranged in a plurality of distinct hole groups;
a resilient member disposed between the upper plate and the lower plate and having a plurality of cavities therein, wherein each cavity communicates with a respective one of said hole groups; and
a plurality of cover means each of which is associated with a respective one of said hole groups and each of which occludes a predetermined number of holes within a respective hole group wherein each of said cover means is secured to a predetermined portion of said surface adjacent a corresponding hole group.

7. A universal shock and vibration mount according to claim 6 further including:
registration means attached to said upper plate for registering said surface with said upper plate.

8. A universal shock and vibration mount according to claim 7 wherein:
said cavities have substantially equal volumes; and
the holes within a hole group are arranged in a first predetermined geometric pattern and the hole groups are arranged in a second predetermined geometric pattern over the surface area of the upper plate.

9. A universal shock and vibration mount for a mass comprising:
a lower plate;
an upper plate formed to accept the mass and having a plurality of openings therethrough disposed in matrices;
resilient means operatively secured between said lower plate and said upper plate and including a plurality of cavities therein, each cavity communicating with a respective one of said matrices;
cover means adapted to be secured to the mass at the interface with said upper plate for blocking selected ones of said openings in each of said matrices;
wherein said upper plate further includes a flat surface having a plurality of edges and a vertical rim around all edges excepting one edge, a pair of structures connected to the bottom of said flat surface adjacent opposite ends of said one edge, a pair of elongated rods each pivotably connected to a respective structure in a vertical plane, and a pair of fasteners each connected to a respective rod for engaging the mass.

* * * * *